United States Patent
Knafou et al.

(10) Patent No.: US 12,054,105 B2
(45) Date of Patent: Aug. 6, 2024

(54) UNFORGEABLE LICENSE PLATE SYSTEM

(71) Applicant: NEO ORIGINALITY LTD., Beer-Sheva (IL)

(72) Inventors: Danny Knafou, Ofakim (IL); Michael Herman, Ofakim (IL)

(73) Assignee: NEO ORIGINALITY LTD, Beer-Sheva (IL)

( * ) Notice: Subject to any disclaimer, the term of this patent is extended or adjusted under 35 U.S.C. 154(b) by 423 days.

(21) Appl. No.: 17/432,233

(22) PCT Filed: Feb. 25, 2020

(86) PCT No.: PCT/IL2020/050208
§ 371 (c)(1),
(2) Date: Aug. 19, 2021

(87) PCT Pub. No.: WO2020/174465
PCT Pub. Date: Sep. 3, 2020

(65) Prior Publication Data
US 2022/0185204 A1    Jun. 16, 2022

Related U.S. Application Data

(60) Provisional application No. 62/810,086, filed on Feb. 25, 2019.

(51) Int. Cl.
| | |
|---|---|
| *B60R 13/10* | (2006.01) |
| *B60Q 1/26* | (2006.01) |
| *B60Q 1/34* | (2006.01) |
| *B60Q 1/50* | (2006.01) |
| *H04W 4/029* | (2018.01) |

(52) U.S. Cl.
CPC ............ *B60R 13/10* (2013.01); *B60Q 1/26* (2013.01); *B60Q 1/343* (2013.01); *B60Q 1/503* (2013.01); *H04W 4/029* (2018.02)

(58) Field of Classification Search
CPC ......... B60R 13/10; B60R 25/104; B60Q 1/26; B60Q 1/343; B60Q 1/503; H04W 4/029
See application file for complete search history.

(56) References Cited

U.S. PATENT DOCUMENTS

| | | | |
|---|---|---|---|
| 2011/0078933 A1* | 4/2011 | Lukawitz | ............... B60Q 1/545 713/168 |
| 2015/0365479 A1 | 12/2015 | Cunningham | |

OTHER PUBLICATIONS

International Search Report issued in Application No. PCT/IL2020/050208 on May 13, 2020, 3 pages.
Written Opinion issued in Application No. PCT/IL2020/050208 on May 13, 2020, 4 pages.

* cited by examiner

*Primary Examiner* — Daryl C Pope
(74) *Attorney, Agent, or Firm* — CANTOR COLBURN LLP

(57) ABSTRACT

The present invention relates to a secured and unforgeable digital license plate that facilitates tracking of a vehicle's location and the monitoring of the vehicle's mechanical and electrical condition, as well as providing indications about the vehicle's traffic and parking lot violations. The display on the digital license plate is highly visible to both motor vehicle enforcement officers and to drivers and passengers of nearby vehicles, and is indicative that the vehicle bearing the digital license plate with the displayed indication is exhibiting anomalous motor activity.

18 Claims, 5 Drawing Sheets

UNFORGEABLE LICENSE PLATE SYSTEM

CROSS REFERENCE TO RELATED APPLICATIONS

This application is a National Stage application of PCT/IL2020/050208, filed Feb. 25, 2020, which claims the benefit of U.S. Provisional Application No. 62/810,086, filed Feb. 25, 2019, both of which are incorporated by reference in their entirety herein.

FIELD OF THE INVENTION

The present invention relates to the field of vehicular authentication. More particularly, the invention relates to an unforgeable digital license plate and a system for generating the digital license plate.

BACKGROUND OF THE INVENTION

Conventional car license plates are made of metal sheets, into which the car number is embossed by transportation authorities. However, these metal license plates are easy to forge and therefore, from time to time, the police detects more than one car with the same license plate number, where only one is authentic. This situation is very problematic, since the legitimate car owner cannot know that other cars have the same license plate number that has been forged without his knowledge.

The only way to discover such illegitimate duplication is when the car with the forged and duplicated license plate is involved in a violation of the law, an illegal activity or in an accident. In this case, the legal owner of the car is subject to police investigations or even to arrest, until an investigation is completed. In addition, some legitimate drivers violate the law by driving without passing annual inspection, which should verify that the car's safety systems (such as lighting, steering and braking systems) are safe and in order. Here again, the authorities cannot detect such violations, unless initiating enforcement inspections, which are limited and cannot encompass all the vehicles on the road.

It is an object of the present invention to provide a secured digital license plate, which is practically unforgeable.

It is another object of the present invention to provide a system for generating the secured digital license plate.

It is another object of the present invention to provide a secured digital license plate which is forced to display, when relevant, an indication that the vehicle bearing the digital license plate is mechanically unsafe or has been involved in a traffic or parking violation, for the benefit of other vehicles.

Other objects and advantages of the invention will become apparent as the description proceeds.

SUMMARY OF THE INVENTION

A secured digital license plate generating system comprises a dedicated server configured to output analyzed vehicle-specific data and which is in data communication with a database of one or more authorities; an array of selectively illuminated and electronically-controlled light sources mounted on a rigid substrate, which when activated, is subdividable into different display regions, including a first display region for displaying a plurality of separated indicia to display a unique vehicle license identifier granted by an authority responsible for safety and ownership of an associated vehicle and a second display region for displaying an anomalous vehicle-specific indication based on said data output by said dedicated server; a controller including a memory and operating software, configured to acquire in-vehicle data and to command said array to display said unique vehicle license identifier and said anomalous vehicle-specific indication in response to said output vehicle-specific data; and a long-range wireless modem configured to securely transmit said acquired in-vehicle data to said dedicated server and to securely receive said vehicle-specific data output from said dedicated server after having been analyzed in response to said transmitted in-vehicle data.

DETAILED DESCRIPTION OF THE INVENTION

A secured digital license plate, which is practically unforgeable and facilitates the tracking of the vehicle's location and the monitoring of the vehicle's mechanical and electrical condition and provides distinctive indications about traffic and parking law violations, is controlled by an external authority. The display of one of the predetermined indications is highly visible to both motor vehicle enforcement officers and to drivers and passengers of nearby vehicles, being indicative that the vehicle bearing the digital license plate with the displayed indication is exhibiting anomalous motor activity and should remain at a distance.

As referred to herein, a "vehicle" bearing the secured digital license plate of the invention is a propelled carrier for passengers and transportable goods or livestock that is registered by an authority responsible for its safety and ownership, including a private vehicle such a car, motorcycle and truck, a public vehicle such as a bus and a van, a land vehicle, a marine vehicle, an amphibious vehicle and an airborne vehicle.

The following description relates to a secured digital license plate which is mounted on a motor vehicle, particularly a passenger car, but it will be appreciated that the invention is applicable to any other vehicle.

When the term "the vehicle" is employed, it is generally referring to the vehicle that bears a secured digital license plate that is displaying information of importance.

Figure 1:
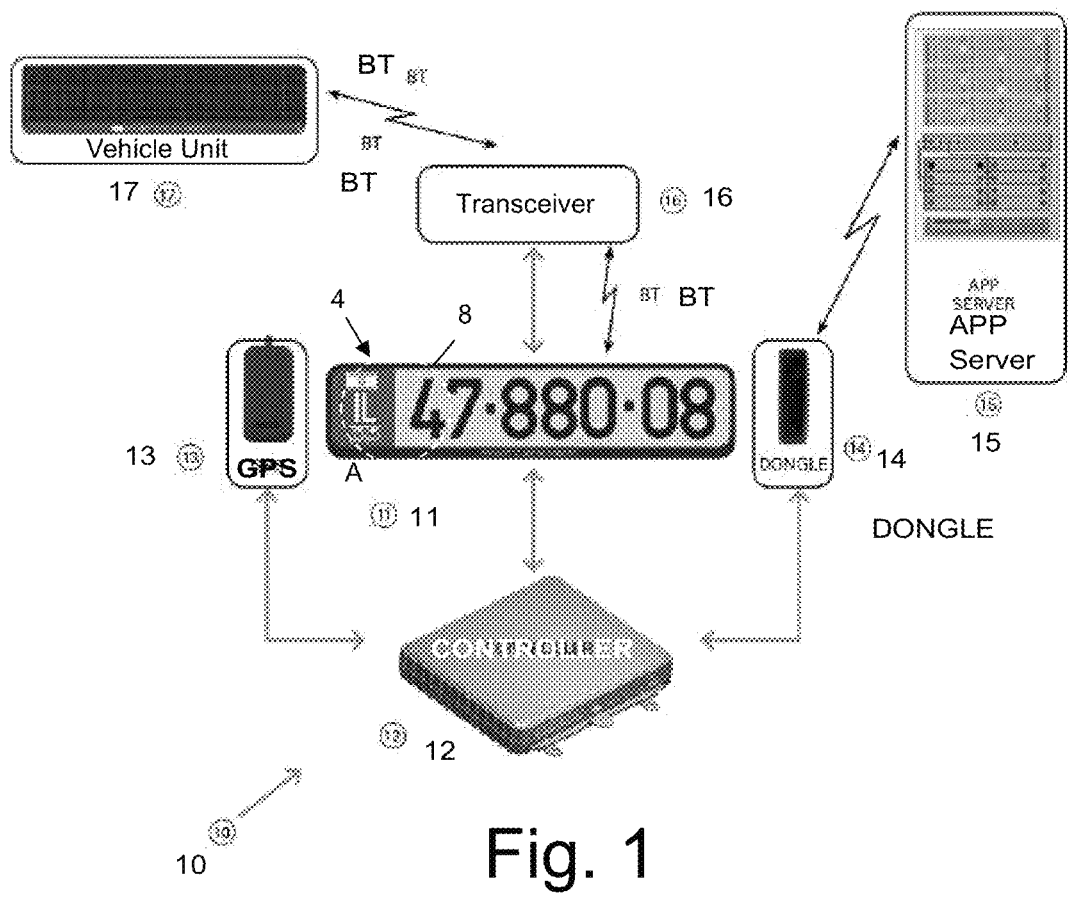
FIG. 1 is a schematic illustration of a secured digital license plate generating system, according to an embodiment.

FIG. 1 is a schematic illustration of a secured digital license plate generating system 10, according to an embodiment of the invention. The digital license plate 4 generated by system 10 comprises an array 11 of selectively illuminated and electronically-controlled light sources, which is forced to display a unique vehicle license identifier, issued by the Ministry of Transportation (or by another appropriate external authority), and other vehicle-specific indications. The array 11 of light sources is mounted on a solid substrate 8 and is operated by means of a printed circuit board applied to the substrate. A digital license plate 4 is generally mounted at both the front and the rear of a vehicle, but may also be mounted at either the front or the rear of a vehicle.

Figure 2:
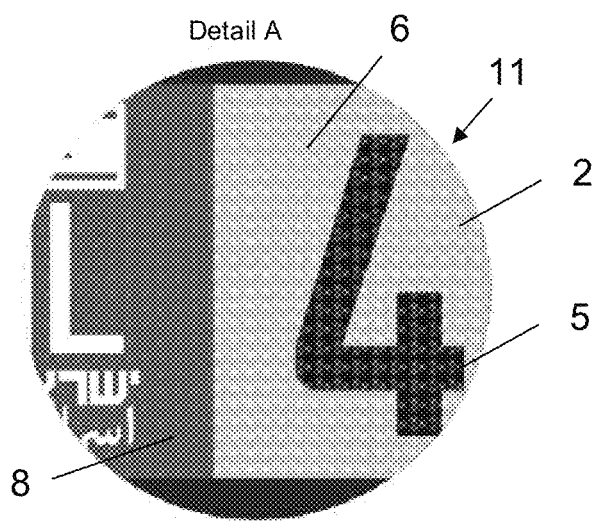
FIG. 2 is an enlargement of Detail A of FIG. 1.

As shown in FIG. 2, array 11 comprises a plurality of selectively illuminated and electronically-controlled light sources 2, such as light emitting diodes (LEDs) or organic light emitting diodes (OLEDs), which are well known to those skilled in the art, and are therefore not described for brevity. Each light source 2 functions as a pixel of the digital license plate, and the resolution of displayed indicia conforms to specifications of the Ministry of Transportation regarding readability of indicia displayed on a license plate. For example, a digital license plate may include 32 vertically separated light sources and 180 lengthwise separated light sources.

The array 11 of light sources is subdivided into different display regions. In a first main display region, a plurality of separated indicia 5, generally numerals but which may also include one or more letters or symbols, are displayed to define the vehicle identifier, or, alternatively, an anomalous vehicle-specific indication. These indicia 5 are displayed by the same color and are generally of a uniform size; however, a symbol separating a group of the indicia may be of a significantly smaller size. In a second display region 6, the light sources are adapted to display a region that functions as a background region using one or more different colors or patterns with respect to the first main display, in order to provide visual indications regarding an updated status of the vehicle (as will be detailed later on). In a third display region 8, a local geographical identifier, such as a municipal, state or country identifier, is displayed in a different fashion than the first and second display regions to indicate to which geographical area is the vehicle associated. The third display region 8 may also display a driver-specific identifier, indicative for example that the driver is engaged in an in-car driving lesson, has a learner's permit and is gaining experience in driving, is handicapped, or has rightfully parked with a mobile parking application.

It will be appreciated that array 11 may be commanded to define only one or two display regions, or even more than three display regions.

Referring back to FIG. 1, digital license plate generating system 10 comprises a controller 12 that comprises memory and operating software (not shown) configured to display the first, second and third display regions. The transmission of data between digital license plate generating system 10 and dedicated server 15 which is specific to the external authority is protected by cryptographic hash, such as blockchain (an open, distributed ledger, which contains a growing list of records, called blocks, which are linked using cryptography and is resistant to modification of the data. Once recorded, the data in any given block cannot be altered retroactively without alteration of all subsequent blocks, which requires consensus of the network majority).

A built in GPS unit 13 provides location data, which will be used to track the vehicle movements. A cellular dongle 14, or other long-range wireless modem, such as one in communication with a cellular Internet network or a satellite Internet network, is used to communicate with dedicated server 15 by a software application which is adapted to provide secure commands and updates to the controller 12, to receive and analyze the data provided by the controller 12 and to be in communication with databases of different authorities for reporting.

The digital license plate generating system 10 may also comprise a Bluetooth (BT) transceiver 16 configured to be in short range communication with a vehicle unit 17 that is specific to each vehicle and rigidly attached to its chassis, and used to uniquely identify it using a unique identifier burned into its memory. The unique identifier is also protected by blockchain.

The operation of the different components of digital license plate generating system 10 consumes power which may be supplied by a power source such as a battery (not shown).

Controller 12 may be adapted to increase the intensity of the light sources, so that the different display regions of digital license plate 10 will be visible during the daytime.

Figure 3:
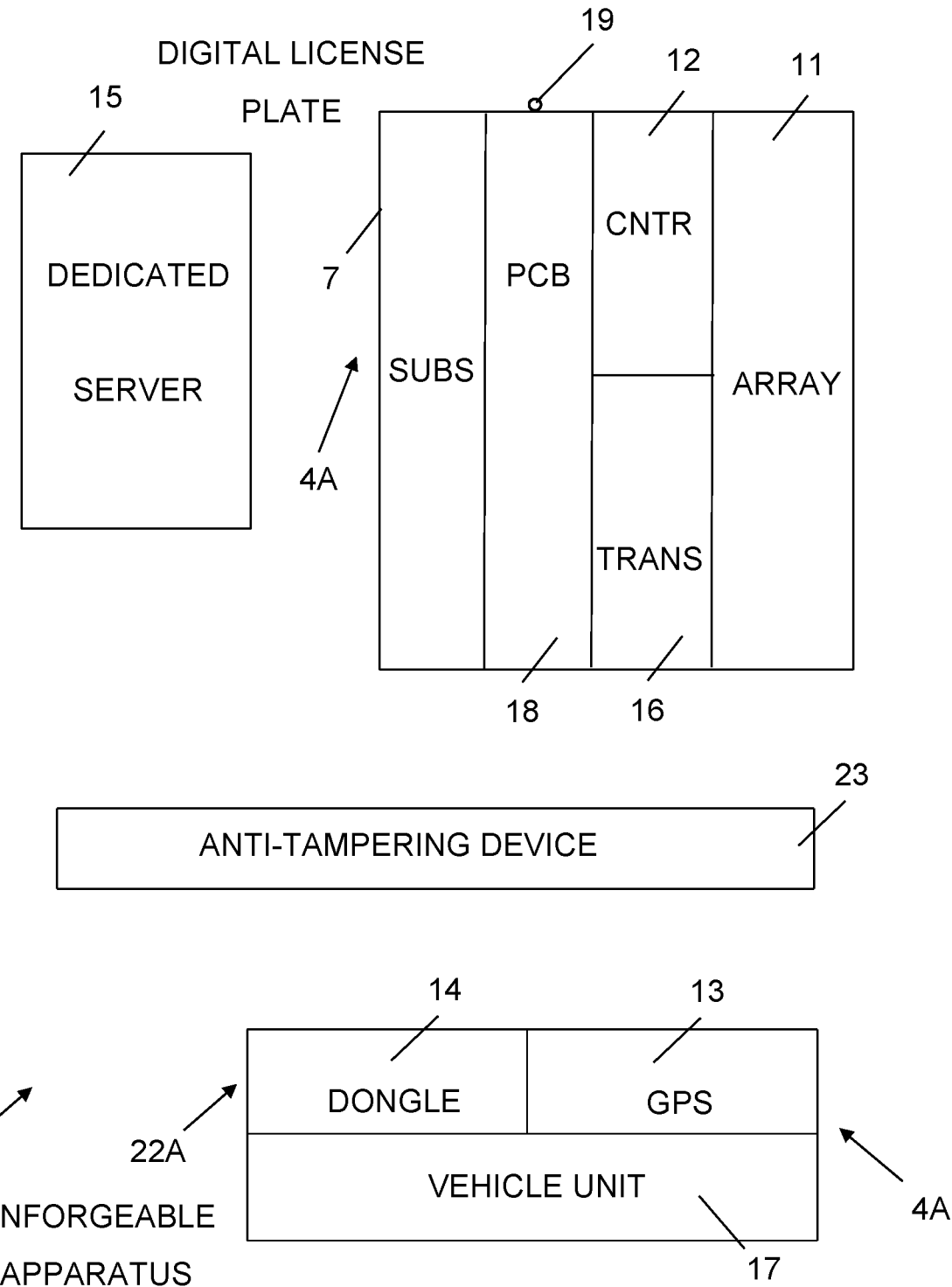
FIG. 3 is a schematic illustration of a secured digital license plate generating system, according to another embodiment.

FIG. 3 schematically illustrates one arrangement of a secured vehicle-specific, digital license plate generating system 10A. System 10A comprises a monolithic digital license plate 4A and an unforgeable data exchange apparatus 22A configured to interact with digital license plate 4A.

Digital license plate 4A comprises rigid substrate 7, array 11 of light sources which is mounted on substrate 7, controller 12, short-range transceiver 16, printed circuit board 18, and port 19 for a power source. Port 19 may receive electrical power from the battery of the vehicle, a rechargeable battery or backup battery of digital license plate 4A, an additional type of a power source, and a combination thereof.

Unforgeable data exchange apparatus 22A, which is mounted on the chassis of the vehicle or on any other inconspicuous region of the vehicle, comprises GPS unit 13 for transmitting the instantaneous location of the vehicle, broadband dongle 14 for communicating with dedicated server 15, and vehicle unit 17 for repeatedly transmitting vehicle-specific identification data, including a chassis identifier and an engine identifier. GPS unit 13 may communicate directly with dedicated server 15, or alternatively may communicate with controller 12 or dongle 14, which is turn causes the instantaneous location data to be transmitted to dedicated server 15.

Controller 12 is input with the following two sets of data that interact with its operating software in order to generate the display of the digital license plate: (1) a first set of vehicle-specific identification data received from vehicle unit 17 via transceiver 16, and (2) a second set of vehicle-specific identification data and status data received from dedicated server 15 via dongle 14. The second set of vehicle-specific data is output from dedicated server 15 in response to analysis of data transmitted thereto by dongle 14 or received from one or more servers in data communication therewith, such as a server of the Ministry of Transportation.

The three display regions of light sources, or any other number, are accordingly commanded to be selectively illuminated in accordance with the second set of data output from dedicated server 15.

If the first and second sets of vehicle-specific identification data do not match with each other in accordance with stored instructions, controller 12 deactivates all of the light sources to demonstrate that the vehicle is not registered with a legitimate vehicle identifier, or alternatively commands the first display region to display the message "STOLEN" or the second display region to change its color to a distinctive color such as yellow that is the accepted indication of a forged license plate. The first and second sets of vehicle-specific identification data will not match with each other if unforgeable data exchange apparatus 22A or vehicle unit 17 has been removed or has been replaced.

Controller 12 may also be configured to deactivate all of the light sources of array 11 or to command array 11 to display an indication of a forged license plate during the occurrence of one of the following events: (i) the casing of unforgeable data exchange apparatus 22A has been tampered with, as detected by an anti-tampering device 23 integrated therewith, or connected thereto, and in data communication with controller 12 or with dedicated server 15; (ii) the casing of vehicle unit 17 has been tampered with, as detected by an anti-tampering device 23 integrated therewith, or connected thereto, and in data communication with controller 12 or with dedicated server 15; and (iii) controller 12 has been tampered with, as detected by an anti-tampering device 23 integrated therewith, or connected thereto, and in data communication with dedicated server 15. The anti-tampering device preferably comprises a detector that is responsive to a tampering activity, such as an attempt of removal, breakage or remote infiltration, and a transmitter for transmitting a radio-wave tampering alarm signal in response to the detected tampering activity.

A memory device of controller 12 may be configured to store data representative of the display of the first display region prior to displaying the indication of a forged license plate. Thus the stored data is retrievable to generate the original display by the first display region once the first and second sets of vehicle-specific identification data match again.

Figure 4:
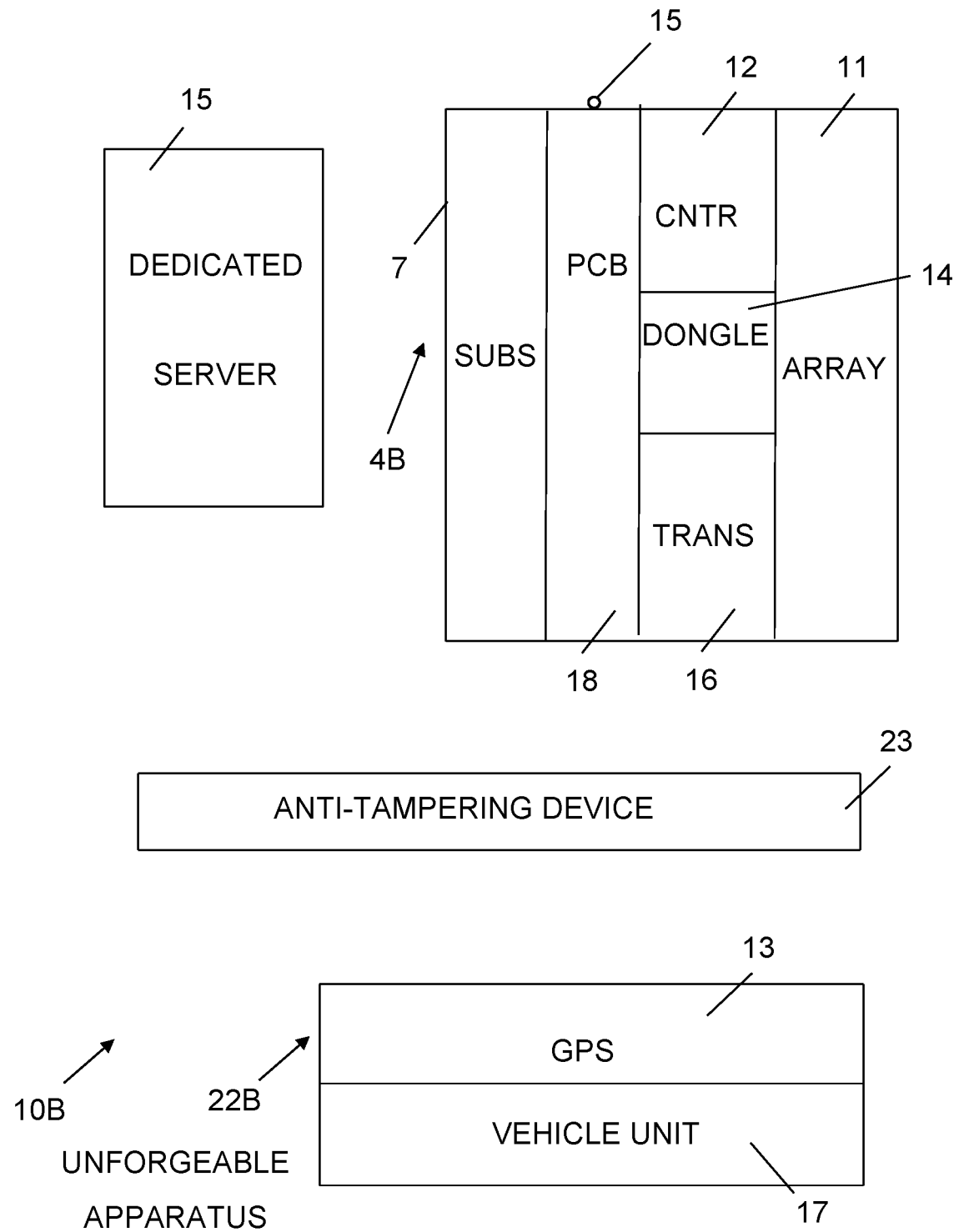
FIG. 4 is a schematic illustration of a secured digital license plate generating system, according to another embodiment.

FIG. 4 schematically illustrates another arrangement of a secured vehicle-specific, digital license plate generating system 10B, which comprises monolithic digital license plate 4B and unforgeable data exchange apparatus 22B configured to interact with digital license plate 4B.

Digital license plate 4B comprises rigid substrate 7, array 11 of light sources which is mounted on substrate 7, controller 12, broadband dongle 14 for communicating with dedicated server 15, short-range transceiver 16, printed circuit board 18, and port 19 for a power source. Port 19 may receive electrical power from the battery of the vehicle, a rechargeable battery or backup battery of digital license plate 4B, an additional type of a power source, and a combination thereof.

Unforgeable data exchange apparatus 22B, which is mounted on the chassis of the vehicle or on any other inconspicuous region of the vehicle, comprises GPS unit 13 for transmitting the instantaneous location of the vehicle, and vehicle unit 17 for repeatedly transmitting vehicle-specific identification data, including a chassis identifier and an engine identifier. GPS unit 13 may communicate directly with dedicated server 15, or alternatively may communicate with controller 12 or dongle 14, which is turn causes the instantaneous location data to be transmitted to dedicated server 15.

Controller 12 is input with the first and second sets of data as described with respect to system 10A of FIG. 3, and its functionality is identical thereto.

Figure 5:
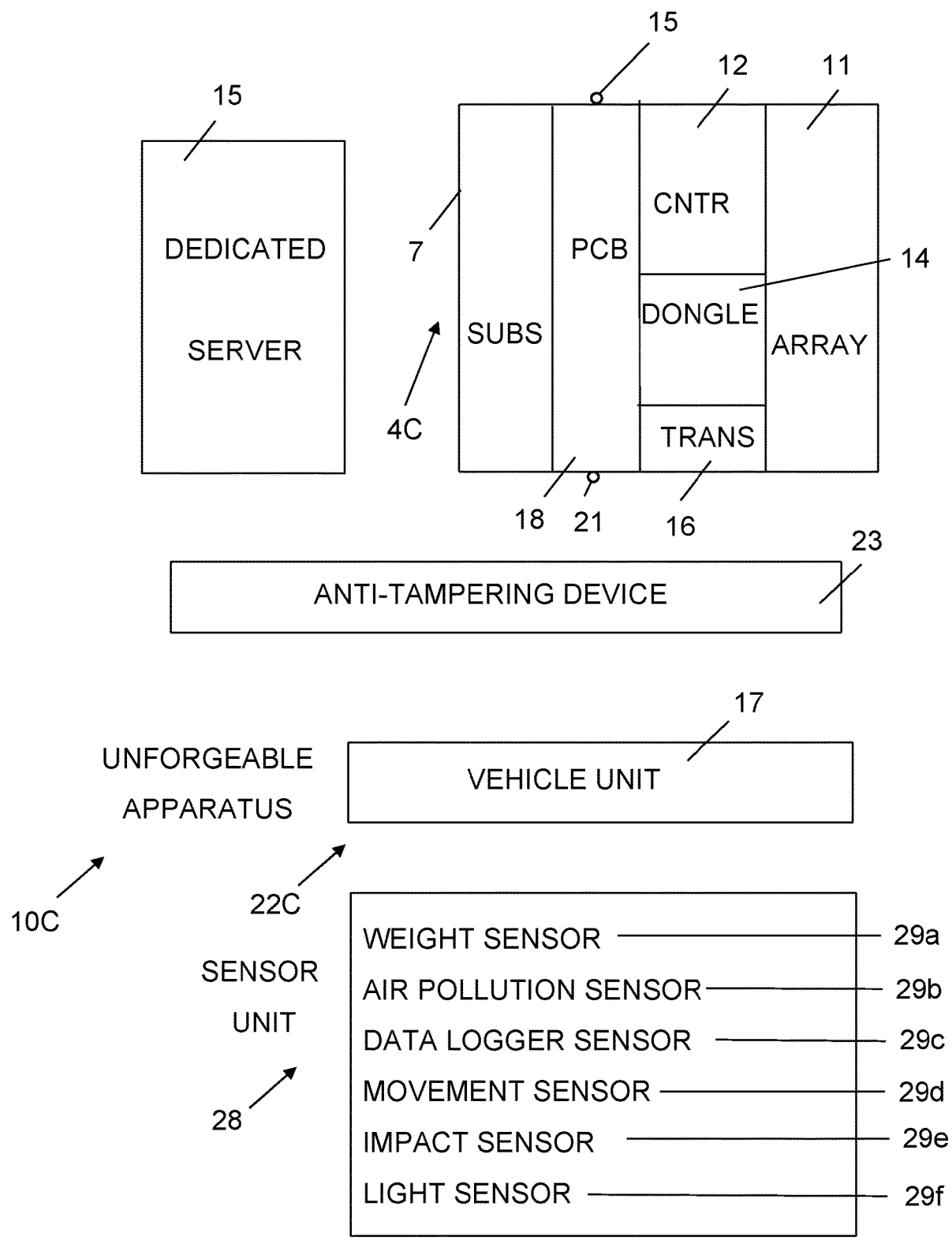
FIG. 5 is a schematic illustration of a secured digital license plate generating system, according to another embodiment.

FIG. 5 schematically illustrates another arrangement of a secured vehicle-specific, digital license plate generating system 10C, which comprises monolithic digital license plate 4C, unforgeable data exchange apparatus 22C configured to interact with digital license plate 4C, and sensor unit 28 adapted to detect real-time or near real-time vehicular conditions.

Digital license plate 4C comprises rigid substrate 7, array 11 of light sources which is mounted on substrate 7, controller 12, GPS unit 13 for transmitting the instantaneous location of the vehicle, broadband dongle 14 for communicating with dedicated server 15, short-range transceiver 16, printed circuit board 18, and port 19 for a power source. Port 19 may receive electrical power from the battery of the vehicle, a rechargeable battery or backup battery of digital license plate 4C, an additional type of a power source, and a combination thereof. A manual power button 21 may also be employed. GPS unit 13 may communicate directly with dedicated server 15, or alternatively may communicate with controller 12 or dongle 14, which is turn causes the instantaneous location data to be transmitted to dedicated server 15.

Unforgeable data exchange apparatus 22C, which is mounted on the chassis of the vehicle or on any other inconspicuous region of the vehicle, comprises vehicle unit 17 for repeatedly transmitting vehicle-specific identification data, including a chassis identifier and an engine identifier.

Sensor unit 28 comprises one or more of the following sensors or group of which are mounted on an inconspicuous region of the vehicle and which transmit the detected data over a corresponding signal to controller 12 via short-range transceiver 16 and in turn to dedicated server 15 via dongle 14:

a) a weight sensor 29a for detecting the weight of a load carried by the vehicle, the first display region being commanded to display the message "HEAVY" or the second display region being commanded to change its color to a distinctive color such as orange that is the accepted indication of an overweight vehicle, if the detected load is higher than a predetermined threshold;

b) an air pollution sensor 29b for detecting the exhaust of the vehicle, the second display region being commanded to change its color to a distinctive color such as grey that is the accepted indication of a vehicle that emits an excessively high level of pollutants, if the detected emission level is higher than a predetermined threshold;

c) a data logger sensor 29c for retrieving data through an interface connected to the on-board diagnostics (OBD) system of the vehicle in order to determine the status of various important vehicle sub-systems, (i) the first display region being commanded to display the message "UNSAFE" or the second display region being commanded to change its color to a distinctive color such as purple that is the accepted indication of a vehicle found to mechanically unsafe, for example when the volume of hydraulic fluid in the steering wheel or brakes is less than a dangerously low value or the air pressure in one or more tires is less than a dangerously low value, (ii) the first display region being commanded to display the message "E FAULT" or the second display region being commanded to change its color to a color such as pink that is the accepted indication of a vehicle found to have an electrical fault, for example when one of the blinkers or lights is malfunctioning, (iii) the first display region being commanded to display an arrow in the direction that the vehicle is turning and the second display region being commanded to change its color to a distinctive color such as red when one of the blinkers is malfunctioning, or the second display region being commanded to change its color to a distinctive color such as white when one of the rear lights is malfunctioning and the vehicle is moving in reverse, and (iv) the first display region being commanded to display the message "RISK" or the second display region being commanded to change its color to a distinctive color such as green that is the accepted indication of a vehicle found to be at risk for an impending malfunction, for example when the alternator is failing, indicating that the vehicle is liable to stall;

d) a movement sensor 29*d* for detecting the current movement status of the vehicle, whether stationary, forwardly moving, or rearwardly moving;

e) an impact sensor 29*e* for detecting whether the vehicle has been impacted by a neighboring vehicle and for determining the magnitude of the impact; and f) a light sensor 29*f* for detecting the ambient light conditions.

After dedicated server 15 outputs status data in response to a reading made by any of these sensors, an alert may be made to the driver, if necessary, for example an alert message displayed on the dashboard by means of the interface connected to the OBD system.

Controller 12 is input with the first and second sets of data as described with respect to system 10A of FIG. 3, and its functionality is identical thereto.

It will be appreciated that sensor unit 28 may be provided with any other embodiment described herein.

Additional Uses of the Digital License Plate Generating System

The digital license plate generating system may be a versatile platform for vehicle identification and tracking.

National Control

Since the digital license plate generating system provides information about the vehicle's movements, this information may be used by the state authorities for analyzing traffic patterns, identifying traffic jams and vehicle distribution among different districts and towns.

By virtue of the air pollution sensor 29*b* which detects the pollutant level emitted by each vehicle and provides indications about which vehicles have an emission level greater than a predetermined threshold, dedicated server 15 may send data relating to the density of polluting vehicles within a predetermined area to a Department of Environment server, which in turn is configured to issue an advisory notice for the benefit of people with lung or heart disease that the local pollution level is excessive.

Impact sensor 29*e* may be used to detect if the vehicle has been involved in an accident. In this case, dedicated server 15 may direct rescue forces to the vehicles involved in the accident. To assist the rescue forces, the second display region of the vehicles involved in the accident may be commanded to change its color to a distinctive color such as blue. In addition, the second display region of vehicles that have been involved in an accident and immediately left the site of the accident, for example within a minute after the time that impact sensor 29*e* detected the impact while the instantaneous vehicle location is detected by GPS unit 13, may be commanded by dedicated server 15 to change its color to a distinctive color such as brown that is indicative of a vehicle that initiated a "hit and run" event. The data generated by each GPS unit 13, movement sensor 29*d* and impact sensor 29*e* may also transmitted to a police-accessible server in order to analyze accidents and the level of responsibility of each involved vehicle.

Similarly, the information provided by the digital license plate generating system may also be used by the police to detect and track criminal activity made by vehicle drivers.

Municipal Control

The information provided by the digital license plate generating system may also be used to enforce parking regulations. For example, dedicated server 15 may be connected to the municipality IT system and provide indications about parking vehicles which park illegally. In this case, upon deciding that a vehicle is parked illegally, dedicated server 15 may send a command to controller 12 to provide a visual indication to a parking supervisor that the vehicle is parked illegally, for example the vehicle is associated with a geographical area that is not granted permission to park in the specific parking area, and to help the parking supervisor with enforcement. The digital license plate generating system may also help to track payment for parking in association with specific parking areas.

According to another embodiment, the collected location data may be used to track transportation and traffic density with respect to timing and location. This can help the police to regulate traffic during rush hours and to develop more infrastructures.

In order to save battery power, the digital license plate generating system may be adapted to activate the array 11 of light sources only when the vehicle is in motion or in the presence of authorized personnel, such as a policeman or a parking officer, located within predetermined proximity to the vehicle.

Figure 6:
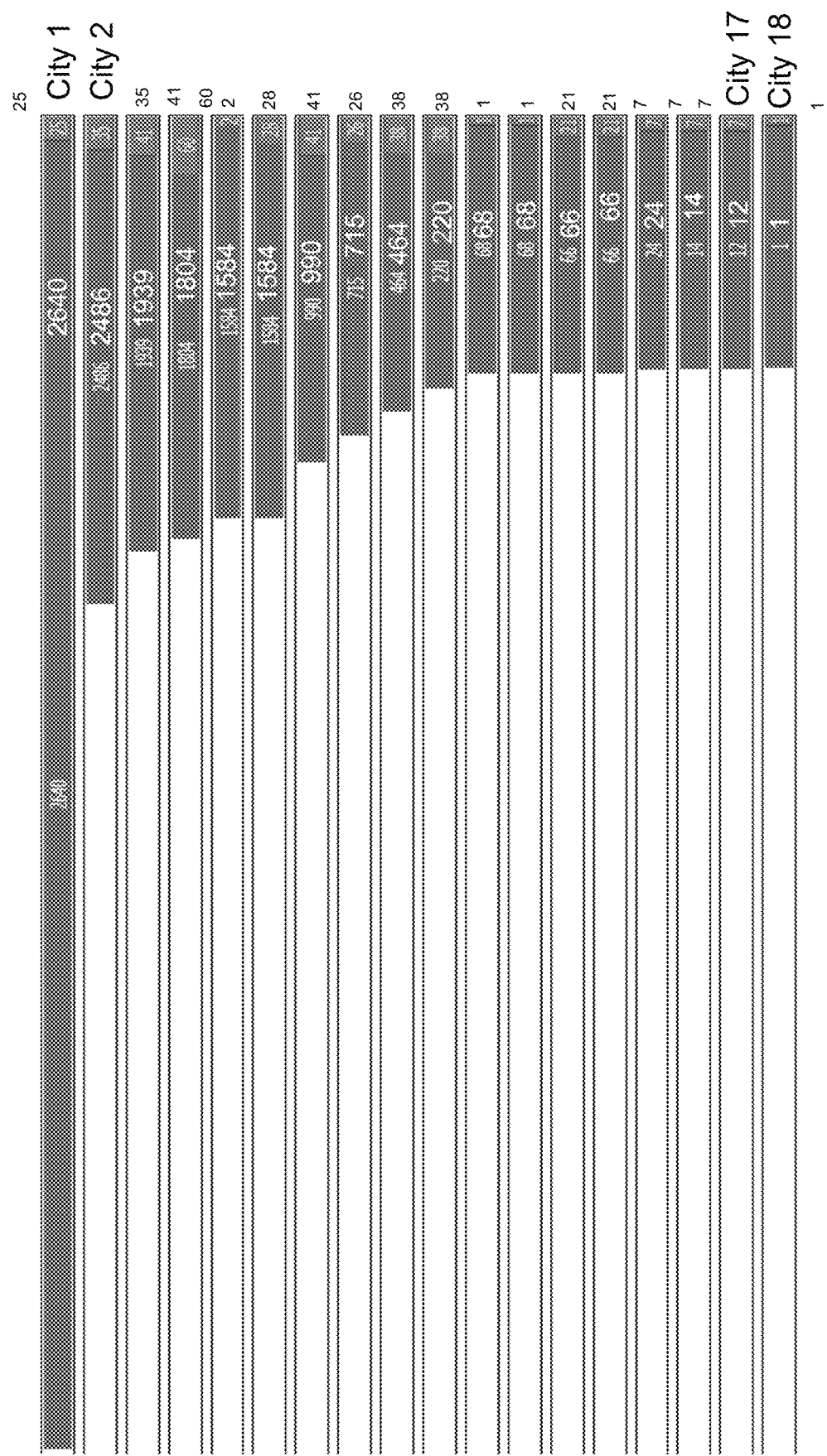
FIG. 6 shows another embodiment, where a control center collects data gathered by the dedicated server and processes the data to generate visual reports regarding various desired parameters.

FIG. 6 shows another embodiment, where a control center collects data gathered by the dedicated server 15 and processes the data to generate visual reports regarding various desired parameters. In this example, the displayed visual report reflects an ordered list of cities along with the average levels of pollution in a descending order. It can be seen that the highest level at City 1 is 2640 and the lowest level at City 18 is 1. The report may also include the number of sampled vehicles and their location over time. Of course, the visual report is continuously updated according to the most updated data.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A secured digital license plate generating system, comprising:

a) a dedicated server configured to output analyzed vehicle-specific data and which is in data communication with a database of one or more authorities;

b) an array of selectively illuminated and electronically-controlled light sources mounted on a rigid substrate, which when activated, is subdividable into different display regions, including a first display region for displaying a plurality of separated indicia to display a unique vehicle license identifier granted by an authority responsible for safety and ownership of an associated vehicle and a second display region for displaying an anomalous vehicle-specific indication based on said data output by said dedicated server;

c) a controller including a memory and operating software, configured to acquire in-vehicle data and to command said array to display said unique vehicle license identifier and said anomalous vehicle-specific indication in response to said output vehicle-specific data; and d) a long-range wireless modem configured to securely transmit said acquired in-vehicle data to said dedicated server and to securely receive said vehicle-specific data output from said dedicated server after having been analyzed in response to said transmitted in-vehicle data; and e) a short-range transceiver in data communication with the controller, and unforgeable apparatus in data communication with said transceiver and rigidly attached to the vehicle, said unforgeable apparatus configured to transmit vehicle-specific identification data burned into its memory to the controller via said transceiver in order to ensure authenticity of the displayed unique vehicle license identifier.

2. The system according to claim 1, in which the long-range wireless modem is protected by blockchain or other protection protocols.

3. The system according to claim 1, in which the controller is adapted to increase the intensity of the light sources, so that the displayed unique vehicle license identifier and anomalous vehicle-specific indication will be visible during daytime.

4. The system according to claim 1, in which the controller is adapted to read weight sensors installed in the vehicle and send alerts regarding overloading.

5. The system according to claim 1, in which information about vehicular movements is used by the state authorities for analyzing traffic patterns, identifying traffic jams and car distribution among different districts and towns.

6. The system according to claim 1, in which the dedicated server sends a command to the controller to display a predetermined background to an area surrounding the displayed unique vehicle license identifier that provides a visual indication about emitting polluting gases.

7. The system according to claim 1, in which the dedicated server sends location indications to rescue forces about the location of vehicles involved in the accident.

8. The system according to claim 7, in which collected location data is used to track transportation and traffic density with respect to timing and location.

9. The system according to claim 1, in which the acquired in-vehicle data is used to enforce parking regulations and upon deciding that a vehicle is parked illegally, the dedicated server outputs the analyzed vehicle-specific data to the controller to command display of a specific anomalous vehicle-specific indication that assists a parking supervisor in enforcing a parking violation.

10. The system according to claim 1, in which the long-range wireless modem is protected by a blockchain or other protection protocols.

11. The system according to claim 1, in which the dedicated server sends data relating to the density of polluting vehicles within a predetermined area to a Department of Environment server, for issuing a notice that the local pollution level is excessive.

12. The system according to claim 1, in which the second display region of the vehicles involved in the accident is commanded to change its color to a distinctive color, for providing indications regarding the type of involvement of said vehicles.

13. A secured digital license plate generating system, comprising:
a) a dedicated server configured to output analyzed vehicle-specific data and which is in data communication with a database of one or more authorities;
b) an array of selectively illuminated and electronically-controlled light sources mounted on a rigid substrate, which when activated, is subdividable into different display regions, including a first display region for displaying a plurality of separated indicia to display a unique vehicle license identifier granted by an authority responsible for safety and ownership of an associated vehicle and a second display region for displaying an anomalous vehicle-specific indication based on said data output by said dedicated server;
c) a controller including a memory and operating software, configured to acquire in-vehicle data and to command said array to display said unique vehicle license identifier and said anomalous vehicle-specific indication in response to said output vehicle-specific data; and
d) a long-range wireless modem configured to securely transmit said acquired in-vehicle data to said dedicated server and to securely receive said vehicle-specific data output from said dedicated server after having been analyzed in response to said transmitted in-vehicle data;
e) a short-range transceiver in data communication with the controller, and unforgeable apparatus in data communication with said transceiver and rigidly attached to the vehicle, said unforgeable apparatus configured to transmit vehicle-specific identification data burned into its memory to the controller via said transceiver in order to ensure authenticity of the displayed unique vehicle license identifier;
f) an air pollution sensor, for detecting the level of pollution around the car and provide indications about vehicles which emit polluting gases in a level which exceeds a predetermined limit.

14. A secured digital license plate generating system, comprising:
a) a dedicated server configured to output analyzed vehicle-specific data and which is in data communication with a database of one or more authorities;
b) an array of selectively illuminated and electronically-controlled light sources mounted on a rigid substrate, which when activated, is subdividable into different display regions, including a first display region for displaying a plurality of separated indicia to display a unique vehicle license identifier granted by an authority responsible for safety and ownership of an associated vehicle and a second display region for displaying an anomalous vehicle-specific indication based on said data output by said dedicated server;
c) a controller including a memory and operating software, configured to acquire in-vehicle data and to command said array to display said unique vehicle license identifier and said anomalous vehicle-specific indication in response to said output vehicle-specific data; and
d) a long-range wireless modem configured to securely transmit said acquired in-vehicle data to said dedicated server and to securely receive said vehicle-specific data output from said dedicated server after having been analyzed in response to said transmitted in-vehicle data;
e) a short-range transceiver in data communication with the controller, and unforgeable apparatus in data communication with said transceiver and rigidly attached to the vehicle, said unforgeable apparatus configured to transmit vehicle-specific identification data burned into its memory to the controller via said transceiver in order to ensure authenticity of the displayed unique vehicle license identifier;
f) an impact sensor to detect if the vehicle has been involved in an accident.

15. The system according to claim 14, in which information derived from the impact sensor is used by the police to detect and track criminal activity made by vehicle drivers.

16. A secured digital license plate generating system, comprising:
- a) a dedicated server configured to output analyzed vehicle-specific data and which is in data communication with a database of one or more authorities;
- b) an array of selectively illuminated and electronically-controlled light sources mounted on a rigid substrate, which when activated, is subdividable into different display regions, including a first display region for displaying a plurality of separated indicia to display a unique vehicle license identifier granted by an authority responsible for safety and ownership of an associated vehicle and a second display region for displaying an anomalous vehicle-specific indication based on said data output by said dedicated server;
- c) a controller including a memory and operating software, configured to acquire in-vehicle data and to command said array to display said unique vehicle license identifier and said anomalous vehicle-specific indication in response to said output vehicle-specific data;
- d) a long-range wireless modem configured to securely transmit said acquired in-vehicle data to said dedicated server and to securely receive said vehicle-specific data output from said dedicated server after having been analyzed in response to said transmitted in-vehicle data;
- e) a short-range transceiver in data communication with the controller, and unforgeable apparatus in data communication with said transceiver and rigidly attached to the vehicle, said unforgeable apparatus configured to transmit vehicle-specific identification data burned into its memory to the controller via said transceiver in order to ensure authenticity of the displayed unique vehicle license identifier; and
- f) connection to the vehicle's on-board diagnostics (OBD) system, for providing indications regarding the status of various vehicle sub-systems.

17. The system according to claim 16, which is adapted to display a current status of the vehicle, including one or more of the following:

Displaying red light whenever the driver presses the braking pedal;

Displaying white light whenever the driver engages the reverse gear;

Displaying a directional arrow whenever the driver activates the blinker to the right or to the left.

18. A secured digital license plate generating system, comprising:
- a. a dedicated server configured to output analyzed vehicle-specific data and which is in data communication with a database of one or more authorities;
- b. an array of selectively illuminated and electronically-controlled light sources mounted on a rigid substrate, which when activated, is subdividable into different display regions, including a first display region for displaying a plurality of separated indicia to display a unique vehicle license identifier granted by an authority responsible for safety and ownership of an associated vehicle and a second display region for displaying an anomalous vehicle-specific indication based on said data output by said dedicated server;
- c. a controller including a memory and operating software, configured to acquire in-vehicle data and to command said array to display said unique vehicle license identifier and said anomalous vehicle-specific indication in response to said output vehicle-specific data;
- d. a long-range wireless modem configured to securely transmit said acquired in-vehicle data to said dedicated server and to securely receive said vehicle-specific data output from said dedicated server after having been analyzed in response to said transmitted in-vehicle data;
- e. a short-range transceiver in data communication with the controller, and unforgeable apparatus in data communication with said transceiver and rigidly attached to the vehicle, said unforgeable apparatus configured to transmit vehicle-specific identification data burned into its memory to the controller via said transceiver in order to ensure authenticity of the displayed unique vehicle license identifier; and
- f. a light sensor for detecting the ambient light conditions and forwarding the detected data to the controller, for controlling the intensity of the light sources.

* * * * *